(12) United States Patent
Numrich et al.

(10) Patent No.: US 7,005,180 B2
(45) Date of Patent: Feb. 28, 2006

(54) OPTICALLY ISOTROPHIC POLYCARBONATE FILMS AND A METHOD FOR THE PRODUCTION THEREOF

(75) Inventors: Uwe Numrich, Gross-Zimmern (DE); Klaus Hofmann, Griesheim (DE); Roger Hugh Emerson, Hong Kong (CN); Thomas Pfaff, Hemsbach (DE); Michael Meier-Kaiser, Alsbach-Haehnlein (DE)

(73) Assignee: Roehm GmbH & Co., KG, Darmstadt (DE)

( * ) Notice: Subject to any disclaimer, the term of this patent is extended or adjusted under 35 U.S.C. 154(b) by 128 days.

(21) Appl. No.: 10/229,013

(22) Filed: Aug. 28, 2002

(65) Prior Publication Data

US 2003/0031849 A1 Feb. 13, 2003

Related U.S. Application Data

(63) Continuation of application No. 09/744,970, filed as application No. PCT/EP99/05966 on Aug. 16, 1999, now Pat. No. 6,613,264.

(30) Foreign Application Priority Data

Aug. 14, 1998  (DE) .......................................... 198 36 800

(51) Int. Cl.
- A21C 11/00 (2006.01)
- B28B 17/00 (2006.01)
- B32B 7/02 (2006.01)
- G03B 21/26 (2006.01)

(52) U.S. Cl. ........................ 428/212; 428/213; 425/166; 425/133.5; 353/35

(58) Field of Classification Search ................. 428/212, 428/213; 425/166, 133.5; 353/35
See application file for complete search history.

(56) References Cited

U.S. PATENT DOCUMENTS

| | | | | |
|---|---|---|---|---|
| 3,975,355 A | * | 8/1976 | Bollen et al. ............... | 523/100 |
| 4,186,154 A | | 1/1980 | Binsack et al. | |
| 4,614,634 A | | 9/1986 | Weber et al. | |
| 5,470,937 A | * | 11/1995 | Okamoto et al. ........... | 528/198 |
| 5,561,180 A | * | 10/1996 | Taketani et al. ............ | 524/108 |
| 6,180,698 B1 | * | 1/2001 | Porter et al. .................. | 524/94 |
| 6,221,988 B1 | * | 4/2001 | Mueller et al. ............. | 526/243 |
| 6,613,264 B1 | | 9/2003 | Numrich et al. | |
| 2003/0031849 A1 | | 2/2003 | Numrich et al. | |
| 2003/0160911 A1 | | 8/2003 | Kano | |

FOREIGN PATENT DOCUMENTS

| | | |
|---|---|---|
| EP | 0 461 485 A2 | 12/1991 |
| JP | 61-255830 | 11/1986 |
| JP | 62-140817 A | 6/1987 |
| JP | 4-275129 | 9/1992 |
| JP | 1995-126375 A | 5/1995 |
| JP | 2932731 B2 | 8/1999 |
| JP | 2002-522280 | 7/2002 |
| NL | 8602018 | 3/1988 |
| NL | 8 802 018 | 3/1990 |
| WO | WO 00/09592 | 2/2000 |

OTHER PUBLICATIONS

H. Bongaerts, "Flat Film Extrusion Using Chill–Roll Casting", Plastics Extrusion Technology, 1997, pp. 161–175.
Cast Contre Turbulaire, 1997, pp. 48–53.
Wittfoht Plastics Technical Dictionary, vol. 1, 1992, pp. 68–69, 170–171, 312–313.
Plastics Extrusion Technology, 1997, p. 200.
Notice of Opposition to the Grant of Patent: Opposition No. 99945983.7; Patent No. EP 1 177 731; Feb. 26, 2003 English translation provided.
Patent Abstracts of Japan, vol. 011, No. 364 (M–646), Nov. 27, 1987, JP 62 140817, Jun. 24, 1987.
Patent Abstracts of Japan, vol. 1998, No. 13, Nov. 30, 1998, JP 10 217313, Aug. 18, 1998.
Derwent Publications, AN 1994–097550, JP 06 048458, Feb. 22, 1994.
Patent Abstracts of Japan, vol. 1996, No. 10, Oct. 31, 1996, JP 08 156120, Jun. 18, 1996.
Derwent Publications, AN 1986–342395, JP 61 255830, Nov. 13, 1986.
Patent Abstracts of Japan, vol. 017, No. 074 (M–1366), Feb. 15, 1993, JP 04 275129, Sep. 30, 1992.
Patent Abstracts of Japan, vol. 011, No. 235 (M–612), Jul. 31, 1987, JP 62 048523, Mar. 3, 1987.
G. Kress, "Striation formation in tubular films –Influence of flow–channel surfaces," G. Kress, Striation formation in tubular films, Kunststoffe, vol. 65, No. 8, 1975, pp. 456–461. German original and English translation.
esp@cenet –English Abstract of EP 1117731.
esp@cenet –English Abstract of JP20020052280.
esp@cenet –English Abstract of JP 61–255830.
Wittfoht, Plastics Technical Dictionary, Reprint, 1992, 3 Parts in 1 Vol., Hanser Publishers, pp. 68–69, 170–171, 312–313.
Plastics Extrusion Technology, Edited by Friedhelm Henson, $2^{nd}$ Edition, 1997, p. 200.
European Patent Office –Notice of Opposition dated Dec. 15, 2003.

(Continued)

*Primary Examiner*—Rena Dye
*Assistant Examiner*—Lawrence Ferguson
(74) *Attorney, Agent, or Firm*—Oblon, Spivak, McClelland, Maier & Neustadt, P.C.

(57) ABSTRACT

Injection-molding materials comprised of polycarbonate can be processed into optically isotropic films in a chill roll extrusion method. The optically isotropic films for protecting data carriers (CD-ROMS) from becoming scratched, or they are used as supporting materials for the information layer.

7 Claims, 1 Drawing Sheet

OTHER PUBLICATIONS

Figure 1:
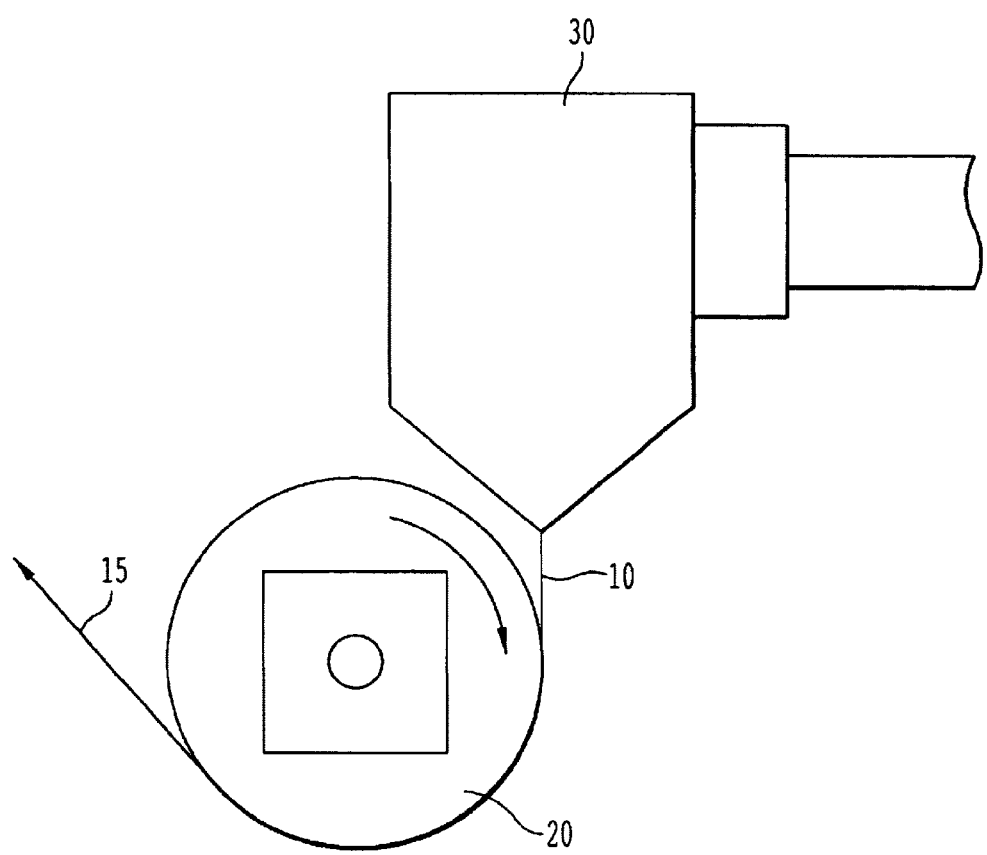

Answer to European Patent Office Opposition dated Apr. 30, 2004 and English Translation.
European Patent Office –Notice of Oral Proceedings with English Translation dated Dec. 23, 2004.
European Patent Office –Interim Decision in the Opposition Proceeding with English Translation dated Jun. 3, 2005.
European Patent Office Notice dated Jan. 29, 2004.
Translation of JP 04 275129.
Additional –revised –Partial translation of JP 04 275129.
Bescheid "Written Opinion" Sep. 11, 1998.
Dictionary of Plastics Technology, pp. 24–25.
European Patent Office Communication dated Apr. 22, 2005.

* cited by examiner

OPTICALLY ISOTROPHIC POLYCARBONATE FILMS AND A METHOD FOR THE PRODUCTION THEREOF

CROSS-REFERENCE TO RELATED APPLICATIONS

This application is a Continuation of U.S. application Ser. No. 09/744,970, filed on Feb. 14, 2001, now allowed as U.S. Pat. No. 6,613,264, which is a National Stage (371) of PCT/EP99/05996, filed Aug. 16, 1999, which claims priority to DE 198 36 800.3, filed on Aug. 14, 1998.

FIELD OF THE INVENTION

The invention relates to polycarbonate films with a high level of purity, that are high-gloss, optically isotropic on both sides, as well as to an economically efficient extrusion process for their production, and the use of the films according to the invention as cover films for optical data media, such as compact disks or DVD disks, for example.

The films according to the invention can also serve as carrier materials for the layer that carries the data, and in this way, extremely thin optical data media can be produced.

STATE OF THE ART

The demands made for sheets and films made of plastic, so that they are suitable for producing or covering optically readable data memory media, are generally known, see J. Hennig, Polymere als Substrate für optische Plattenspeicher [Polymers as substrates for optical disk memory media], Angew. Makromolekulare Chemie [Applied Macromolecular Chemistry], Volume 145/146, 1986 (page 391–409). Furthermore, the sheets and films are not allowed to contain any foreign particles with a size of more than 10 micrometers, and no bubbles are allowed to form during processing. The double refraction resulting from shaping should be as low as possible.

Optical data media in the form of compact disks have been extensively produced using the injection-molding process, up to the present. Other processes that can also be used to produce optical data media with a larger size are based on plain sheets of plastic, which are subsequently provided with the layer that carries the data.

EP 461 485 (Röhm GmbH) describes an extruded plain sheet or film made of plastic and its production process. The polycarbonate melt is pressed out of a broad-slit die or an extruder at approximately 290° C., and calendered in a roller frame consisting of a high-gloss steel roller and a padded blanket roller. In this way, a polycarbonate film that is high-gloss on one side and matt on the other, with a thickness of 450 µm, is obtained.

EP 351 886 (Bayer AG) describes a casting process for the production of polycarbonate films. The polycarbonate, with an average molecular weight of 98,000, is dissolved in methylene chloride, and the solution is applied to a slowly rotating, heated, and polished cylinder, using a ductor device. In this way, a clear, transparent film with a thickness of 200 µm is obtained. A high degree of double refraction results, with a layer difference of ΔG=74 nm. The polycarbonate films obtained in this way, which are not free of double refraction, are clamped in place and heated for 5 to 60 seconds, using a quartz heat emitter. This results in a reduction of the undesirable double refraction to values that are no longer a problem.

JP 07 126375 (Teijin Kasei Ltd.) describes the production of a film made of polycarbonate, with low double refraction. The low specific double refraction of the polycarbonate film is achieved by using a protective layer made of polyolefins.

CRITICISM OF THE STATE OF THE ART

Conventional methods for the production of thin, optically isotropic polycarbonate films function either on the basis of costly casting processes, in which complicated apparatus measures must be provided to prevent the emission of toxic organic solvents, or on the basis of complicated extrusion processes, in which either a polycarbonate film that is matte on one side, or an optically anisotropic polycarbonate film is produced in a first step.

These optically anisotropic extrusion films as last mentioned must be converted into optically isotropic extrusion films that are high-gloss on both sides, in subsequent steps. A two-stage extrusion process is extremely costly. The films are not provided with optimum surface properties, although they are optically somewhat isotropic.

Task

The invention was therefore based on the task of producing optically isotropic polycarbonate films that are high-gloss on both sides, while avoiding the economic disadvantages and the disadvantages of production technology that have been described for the state of the art. The films are supposed to be optically and mechanically isotropic, have a high level of surface quality, and possess the greatest possible optical purity.

Solution

Surprisingly, optically high-quality polycarbonate extrusion films in a thickness range <200 µm, preferably 15 to 150, especially preferably 30 to 100, particularly especially 60 to 90 µm, can be produced using the chill-roll process, with the profile of properties as described. To achieve the high level of optical purity, a polycarbonate injection-molding mass with a relatively low molecular weight is preferably used, such as that used for the production of injection-molded optical data media in large amounts.

The molecular weight $M_w$ of the polycarbonate molding mass used lies between 10,000 and 40,000, preferably between approximately 15,000 and approximately 20,000 (injection-molding mass). The injection-molding mass not intended for extrusion use, in particular, can surprisingly be extruded using the chill-roll process, at a high level of economic efficiency and while avoiding toxic solvents, to produce films with the required profile of properties (see FIG. 1).

IMPLEMENTATION OF THE INVENTION

A significant element for the invention is the use of the melt-casting process, also called chill-roll process. In this process, the melt film that exits from the die is applied to a cooling roller (chill roll) and cooled as this happens. This makes it possible to produce extremely thin films (down to 15 µm) with a low level of optical anisotropism (almost isotropic films).

Almost isotropic is understood to mean that a beam of light penetrating the film medium undergoes only a deflection that is so low that it can be ignored, e.g. a layer difference of at most 50 nm, preferably at most 35 nm, especially preferably at most 25 nm.

The processing temperature for the polycarbonate molding mass lies between 210 and 260, preferably 220 to 240° C.

In order to avoid crystallite deposits in the die, it is advantageous to start the extrusion system at a processing temperature of 250 to 260° C. To achieve the lowest possible degree of gel body formation, the processing temperature can be successively reduced to 220 to 240° C. after the start-up phase of about 10 minutes to about 1 hour.

To avoid die lines or extrusion stripes on the extruded film, it is recommended to polish the internal extrusion die surface, where it is advantageous if this surface is chrome-plated, particularly the lip region. For the extrusion die lip region, the peak-to-valley height $R_A$ according to DIN 4768 should be 0.025 to 0.002, preferably 0.015 to 0.002, especially preferably 0.01 to 0.002. It is advantageous if the roughness of the distribution channel is at most 0.1.

Another improvement in quality, particularly the avoidance of die lines or extrusion stripes, of the extruded film can be achieved if the internal surface of the extrusion die is provided with an agent that repels polycarbonate melt. This can be done by coating the cleaned internal die surface with such an agent, for example silicone oil. The agent should not increase the peak-to-valley height as a whole, or not increase it significantly, but preferably it should reduce this height.

Another factor that can influence the quality of the extruded polycarbonate film is slight contamination of the polycarbonate melt. It is therefore advantageous to install a melt filter between the extrusion cylinder and the extrusion die. The mesh size of the filter insert should be 5 to 50 μm.

Another measure that can contribute to high-quality polycarbonate films is mixing a lubricant into the molding mass formulation. Usual amounts are between 0.01 and 1 wt.-% with reference to the molding mass. Examples for suitable lubricants are partially oxidized polyethylene, pentaerythrite stearate, or $C_{10}$ to $C_{20}$ fatty acid esters.

A high level of optical purity as well as a high level of optical isotropy are the significant basic requirements for the use of films in the stated apparatus.

Using the process according to the invention, it is possible to produce polycarbonate films with high optical quality. High optical quality is particularly understood to mean: A low level of double refraction, a high level of transmission, slight formation of extrusion stripes or die lines (which can be measured by a slight deflection of linear polarized light), as well as a low number of gel bodies per area unit.

Preferably, the film according to the invention does not have a deflection of linear polarized light greater than 2 angle minutes in any region of the surface.

The measurement is taken by recording the angle of deflection that a laser beam experiences as it penetrates the film. For this purpose, the so-called laser deflection method is used. The angle of deviation that a laser beam of 632,8 nm experiences when passing vertically through the film, perpendicular to the extrusion direction, is measured over the entire extrusion width, using a displacement table that is operated by means of a stepper motor. The transmitted beam then passes through a telescope, in order to amplify the angle of deflection, and hits a position-sensitive digital optical sensor. This sensor determines the location of the center of the point of light that impacts on it, and outputs it in the form of x and y coordinates, via a serial interface. Only the y component is relevant for an assessment of die lines.

Possible uses of the films according to the invention are as scratch-protection films for optical data media, as carrier materials for optical data media, as base materials for the production of overlay films for displays and screens.

EXAMPLES

Example 1

Production of the film according to the invention by means of chill-roll extrusion of a polycarbonate molding mass for optical injection-molding applications.

The melt, produced by means of a single-screw or twin-screw extruder (to ensure constancy of the melt flow, a melt pump can optionally be used), is passed to the chill-roll roller (peak-to-valley height $R_A$ 0.002–0.006, $R_T$=0.02–0.004, measured according to DIN 4768), via an automatically regulated die designed for film extrusion. The peak-to-valley height $R_A$ of the extrusion die lip region is 0.02. The internal surface of the die was provided with silicone oil, to make it repel polycarbonate melt. The temperature of the melt flow is 235° C.±5° C. The melt film comes to rest tangentially against the roller surface, and surrounds the roller by about 180° C. After having passed around additional rollers, the thickness of the film web is determined using a contact-free measurement system that is arranged on a traverse, and the melt distribution of the die is regulated over the width, using an expansion bolt system, based on the electronically processed data. The relativized films possess a high level of optical and also mechanical isotropism. The latter is particularly important for the processing behavior, e.g. punching to CD size, since PC injection-molding masses are clearly more brittle than PC extrusion masses, because of their low molecular weight.

Comparison Example 1

Polycarbonate film produced using the planishing process, thickness 0.13 mm.

The melt, produced by means of a single-screw or twin-screw extruder (to ensure constancy of the melt flow, a melt pump can optionally be used), is passed to the planishing rollers via a die designed for film extrusion. The melt is sized in a defined roller nip and planished and cooled by the surface of the tempered rollers, which are polished to a high-gloss mirror finish (peak-to-valley height $R_A$ 0.002–0.006, $R_T$=0.02–0.04, measured according to DIN 4768), via an automatically regulated die designed for film extrusion. In this connection, the geometric shape of one or both rollers, deviating from a cylinder shape, is ground to a bomb-type shape. The bomb curvature is 0.1 to 0.2 mm, with reference to the diameter of the roller. The bomb curvature is of decisive significance for a uniform thickness distribution over the width of the film web.

Because of the high roller nip forces that are typical for this process, the polymer molecules are stretched lengthwise in the extrusion direction. The resulting orientation leads to marked optical anisotropism, which is clearly too high.

Comparison Example 2

Production of a cast polycarbonate film with a thickness of 0.08 mm takes place according to the following process:

Polycarbonate is dissolved in a mixing container equipped with a stirring mechanism, in a solvent mixture of acetone and methylene chloride.

Gross contaminants are subsequently removed from the polycarbonate solution, using a 2 μm membrane filter press. The polycarbonate solution is subsequently processed in a casting machine that is composed of a steel strip with a length of 48 mm, driven by two drums with a diameter of 3 m, to produce a film with a thickness of 80 μm. The solvent, which evaporates off during the subsequent drying process, is returned to the process.

The resulting PC cast films do possess sufficiently low optical anisotropism, but they are not free of disruptive optical effects, such as gel particles and stripes.

Production of cast films from organic solution is a costly process, which also sets great demands with regard to safety technology. The resulting films are not free of the highly toxic solvent, and therefore they are problematic, from a toxicological point of view.

The large-area steel strip is clearly more difficult to produce and maintain in a high-quality optical condition than the clearly lesser area of the chill-roll roller of the melt-casting process according to the invention. This results in an impermissibly high number of stripes on the film surface. In spite of the use of 2 μm membrane filter presses, it is not possible to avoid gel-body-like aggregates that reduce the laser signal intensity. In contrast to melt processing in extruder systems, there is no shear field applied in "solution casting," and therefore the portions of the polycarbonate with a high molecular weight, which are difficult to break up, aggregate because of the possibility of "micro-Brownian movement," i.e. they strive towards the condition of the lowest possible interfacial energy.

The gel bodies and stripes reduce the laser signal intensity to an impermissibly low level, resulting in a significant number of error messages when playing CD systems protected in this way.

| Reference Symbols | |
|---|---|
| 10 | melt film |
| 15 | film formed from the melt film |
| 20 | chill-roll roller |
| 30 | die |

| | Property | | | | |
|---|---|---|---|---|---|
| Example | Shrinkage 190° C./30 min. [%] MD*/TD* | Haze [%] ASTM-1003 | Layer difference [nm] | Double refraction Δn | Tensile test ISO 527-3 Elongation to tear [%] MD*/TD* |
| Film according to the invention Chill-roll extrusion of PC molding mass for injection-molding of optical data media, thickness: 0.08 mm | <1/<1 | 0.5 | 31 | $4 \cdot 10^{-4}$ | 39/35 |
| Comparison Example 1 PC film extrusion molding mass, produced using the planishing process, thickness: 0.13 mm | 31/−7 | 0.3 | 360 | $3 \cdot 10^{-3}$ | 145/99 |
| Comparison Example 2 PC film, cast from organic solution (trade name Pokalon), thickness: 0.08 mm | 3 | 1.2 | 29 | $4 \cdot 10^{-4}$ | not measured |

*MD: machine direction
*TD: traverse direction
Comment:
"Shrinkage" distinguishes the invention from Comparison Example 1.
Haze distinguishes the invention from Comparison Example 2.
Double refraction and layer difference distinguish the invention from Comparison Example 1.
Elongation to tear distinguishes the invention from Comparison Example 1.

What is claimed is:

1. A polycarbonate film obtained by a process comprising i) extruding a polycarbonate injection-molding mass through an extrusion die to form a polycarbonate film;

ii) passing said polycarbonate film to a chill roller; and iii) cooling said polycarbonate film, wherein said polycarbonate film has a thickness of less than 200 μm and wherein said polycarbonate film does not exhibit, in any region of the surface, a deflection of linearly polarized light of greater than 2 minutes of angle, where the angle of deflection is measured by a laser deflection method at 632.8 nm.

2. A scratch protection film for optical data media comprising the polycarbonate film of claim 1.

3. A carrier material for optical media comprising the polycarbonate film of claim 1.

4. A base material for the production of overlay films for displays and screens comprising the polycarbonate film of claim 1.

5. The polycarbonate film of claim 1, wherein said thickness is in the range of from 15 to 150 μm.

6. The polycarbonate film of claim 1, wherein said thickness is in the range of from 30 to 100 μm.

7. The polycarbonate film of claim 1, wherein said thickness is in the range of from 60 to 90 μm.

* * * * *

UNITED STATES PATENT AND TRADEMARK OFFICE
CERTIFICATE OF CORRECTION

| | |
|---|---|
| PATENT NO. | : 7,005,180 B2 |
| APPLICATION NO. | : 10/229013 |
| DATED | : February 28, 2006 |
| INVENTOR(S) | : Uwe Numrich et al. |

It is certified that error appears in the above-identified patent and that said Letters Patent is hereby corrected as shown below:

On title page
Item (54), the title should read --OPTICALLY ISOTROPIC POLYCARBONATE FILMS AND A METHOD FOR THE PRODUCTION THEREOF--

Col. 50 Line 50
Delete Claims 1-7 and replace with the following allowed (renumbered) claims:

--1. A polycarbonate film obtained by a process comprising
    i) extruding a polycarbonate injection-molding mass through an extrusion die to form a polycarbonate film;

ii) passing said polycarbonate film to a chill roller; and iii) cooling said polycarbonate film, wherein said polycarbonate film has a thickness of less than 200 $\mu$m and wherein said polycarbonate film does not exhibit, in any region of the surface, a deflection of linearly polarized light of greater than 2 minutes of angle, where the angle of deflection is measured by a laser deflection method at 632.8 nm.

2. The polycarbonate film according to claim 1, wherein said polycarbonate injection-molding mass has an average molecular weight of from 10,000 to 40,000.

3. The polycarbonate film according to claim 1, wherein the internal surface of said extrusion die, in the extrusion die lip region, has a peak-to-valley height of 0.025 to 0.002 pursuant to DIN 4768.

4. The polycarbonate film according to claim 1, wherein the internal surface of said extrusion die is provided with an agent that repels said polycarbonate melt film.

5. A scratch protection film for optical data media comprising the polycarbonate film of claim 1.

6. A carrier material for optical media comprising the polycarbonate film of claim 1.

7. A base material for the production of overlay films for displays and screens comprising the polycarbonate film of claim 1.

8. The polycarbonate film according to claim 1, wherein said extrusion die is a single-screw extruder or a twin-screw extruder.

UNITED STATES PATENT AND TRADEMARK OFFICE
CERTIFICATE OF CORRECTION

| | | |
|---|---|---|
| PATENT NO. | : 7,005,180 B2 | |
| APPLICATION NO. | : 10/229013 | |
| DATED | : February 28, 2006 | |
| INVENTOR(S) | : Uwe Numrich et al. | |

It is certified that error appears in the above-identified patent and that said Letters Patent is hereby corrected as shown below:

Col. 50 Line 50 (cont'd)

9. The polycarbonate film of claim 1, wherein said thickness is in the range of from 15 to 150 $\mu$m.

10. The polycarbonate film of claim 1, wherein said thickness is in the range of from 30 to 100 $u$m.

11. The polycarbonate film of claim 1, wherein said thickness is in the range of from 60 to 90 $u$m.

12. The polycarbonate film according to claim 2, wherein said average molecular weight of from 15,000 to 20,000.

13. The polycarbonate film according to claim 1, wherein said extruding is carried out at a temperature of from 210 to 260°C.

14. The polycarbonate film according to claim 1, wherein said extruding is carried out at a temperature of from 220 to 240°C.

15. The polycarbonate film according to claim 1, wherein said extruding is initiated at a temperature of from 250 to 260°C, and said temperature is reduced to 220 to 240°C during said extruding.

16. The polycarbonate film according to claim 4, wherein said agent is silicon oil.

17. The polycarbonate film according to claim 1, further comprising, passing said polycarbonate melt film through a melt filter prior to passing said polycarbonate melt film to said chill roller.

18. The polycarbonate film according to claim 1, wherein said polycarbonate injection-molding mass is mixed with from 0.01 to 1.0 wt%, based on said polycarbonate injection-molding mass, of a lubricant.

19. The polycarbonate film according to claim 18, wherein said lubricant is selected from the group consisting of a partially oxidized polyethylene, a pentaerythrite stearate, and a $C_{10}$ to $C_{20}$ fatty acid ester.

UNITED STATES PATENT AND TRADEMARK OFFICE
CERTIFICATE OF CORRECTION

PATENT NO. : 7,005,180 B2
APPLICATION NO. : 10/229013
DATED : February 28, 2006
INVENTOR(S) : Uwe Numrich et al.

It is certified that error appears in the above-identified patent and that said Letters Patent is hereby corrected as shown below:

Col. 50 Line 50 (cont'd)

20. The polycarbonate film according to claim 2, wherein the internal surface of said extrusion die, in the extrusion die lip region, has a peak-to-valley height of 0.025 to 0.002 pursuant to DIN 4768.

21. The polycarbonate film according to claim 2, wherein the internal surface of said extrusion die is provided with an agent that repels said polycarbonate film.

22. The polycarbonate film according to claim 21, wherein said agent is silicon oil.

23. The polycarbonate film according to claim 2, wherein said extrusion die is a single-screw extruder or a twin-screw extruder.

24. The polycarbonate film according to claim 2, wherein said thickness is in the range of from 15 to 150 $\mu$m.

25. The polycarbonate film according to claim 2, wherein said thickness is in the range of from 30 to 100 $\mu$m.

26. The polycarbonate film according to claim 2, wherein said thickness is in the range of from 60 to 90 $\mu$m.

27. The polycarbonate film according to claim 2, wherein said extruding is carried out at a temperature of from 210 to 260°C.

28. The polycarbonate film according to claim 2, wherein said extruding is carried out at a temperature of from 220 to 240°C.

29. The polycarbonate film according to claim 2, wherein said extruding is initiated at a temperature of from 250 to 260°C, and said temperature is reduced to 220 to 240°C during said extruding.

30. The polycarbonate film according to claim 2, further comprising, passing said polycarbonate film through a melt filter prior to passing said polycarbonate film to said chill roller.

31. The polycarbonate film according to claim 2, wherein said polycarbonate injection-molding mass is mixed with from 0.01 to 1.0 wt%, based on said polycarbonate injection-molding mass, of a lubricant.

UNITED STATES PATENT AND TRADEMARK OFFICE
CERTIFICATE OF CORRECTION

PATENT NO. : 7,005,180 B2
APPLICATION NO. : 10/229013
DATED : February 28, 2006
INVENTOR(S) : Uwe Numrich et al.

It is certified that error appears in the above-identified patent and that said Letters Patent is hereby corrected as shown below:

Col. 50 Line 50 (cont'd)

32. The polycarbonate film according to claim 31, wherein said lubricant is selected from the group consisting of a partially oxidized polyethylene, a pentaerythrite stearate, and a $C_{10}$ to $C_{20}$ fatty acid ester.

33. A scratch protection film for optical data media comprising the polycarbonate film of claim 2.

34. A carrier material for optical media comprising the polycarbonate film of claim 2.

35. A base material for the production of overlay films for displays and screens comprising the polycarbonate film of claim 2. --

Signed and Sealed this

Eleventh Day of September, 2007

JON W. DUDAS
*Director of the United States Patent and Trademark Office*